No. 662,040. Patented Nov. 20, 1900.
T. L. & T. J. STURTEVANT.
EXPLOSION ENGINE.
(Application filed Feb. 6, 1900.)
(No Model.) 5 Sheets—Sheet 1.
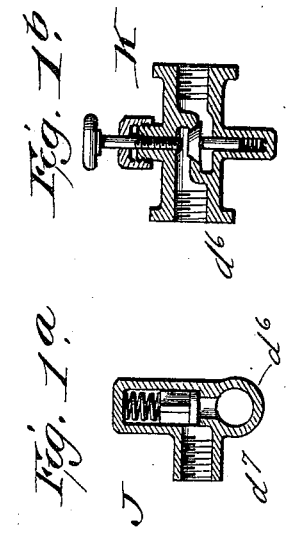
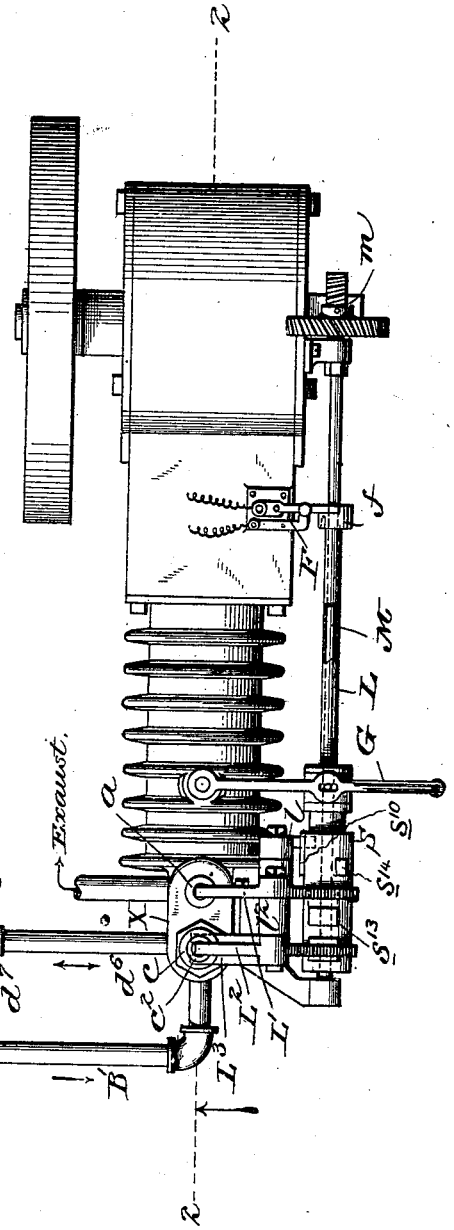
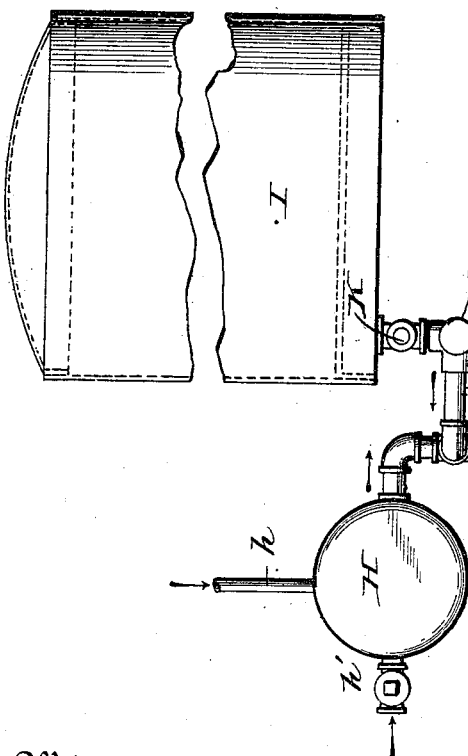

No. 662,040. Patented Nov. 20, 1900.
T. L. & T. J. STURTEVANT.
EXPLOSION ENGINE.
(Application filed Feb. 6, 1900.)
(No Model.) 5 Sheets—Sheet 2.
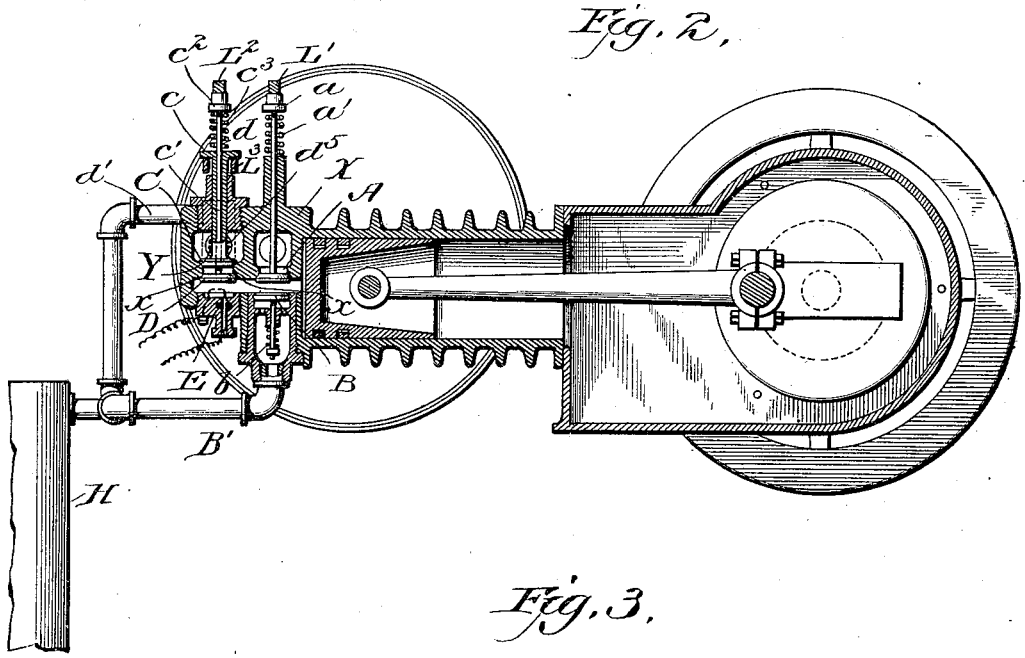

No. 662,040. Patented Nov. 20, 1900.
T. L. & T. J. STURTEVANT.
EXPLOSION ENGINE.
(Application filed Feb. 6, 1900.)
(No Model.) 5 Sheets—Sheet 3.
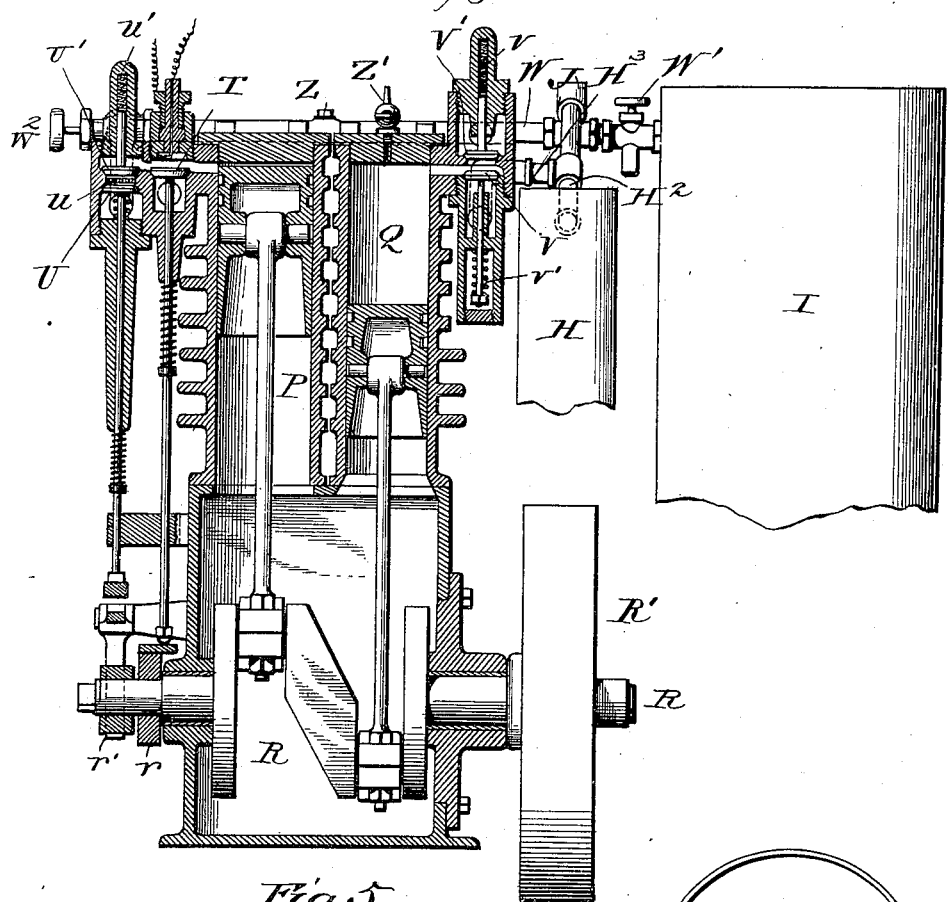
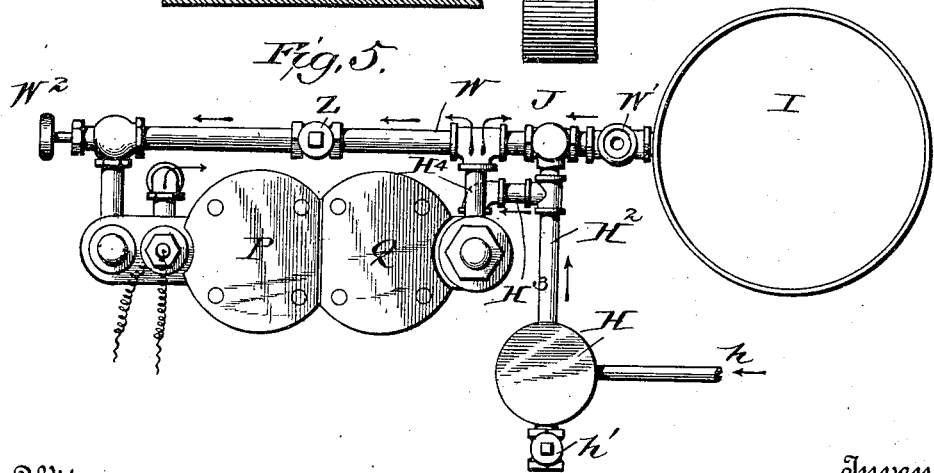

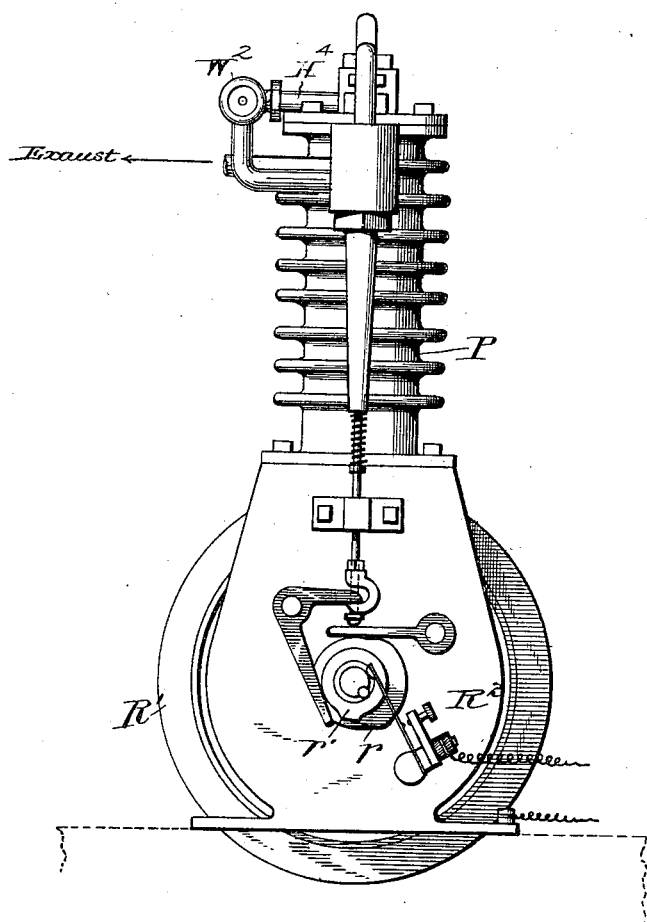

No. 662,040. Patented Nov. 20, 1900.
T. L. & T. J. STURTEVANT.
EXPLOSION ENGINE.
(Application filed Feb. 6, 1900.)
(No Model.) 5 Sheets—Sheet 5.
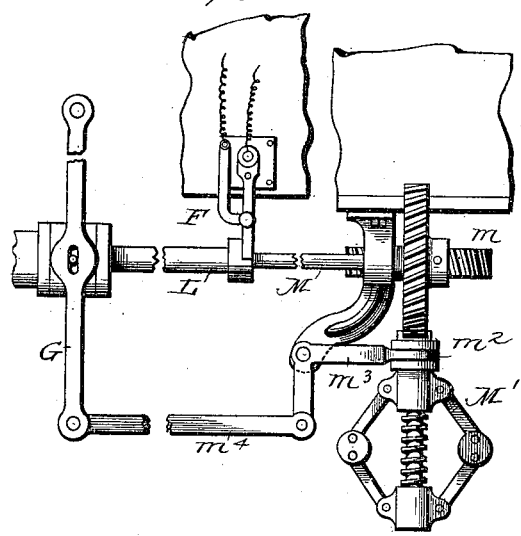
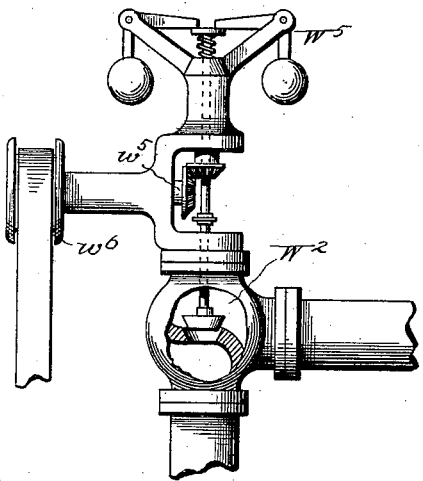
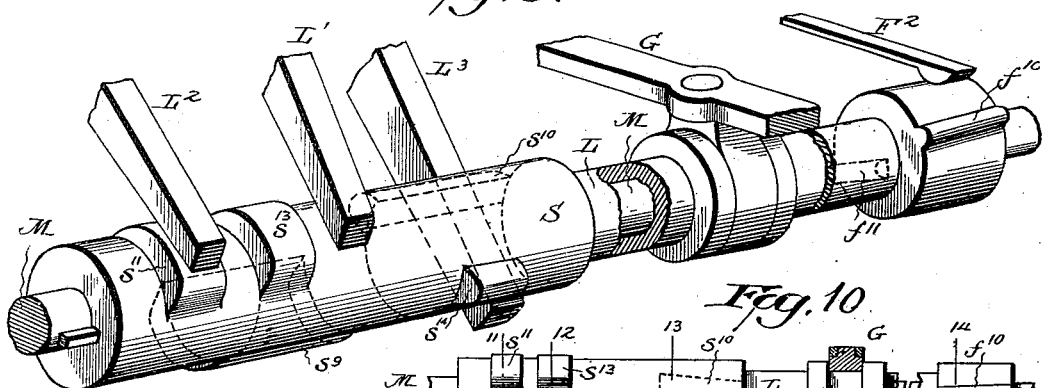
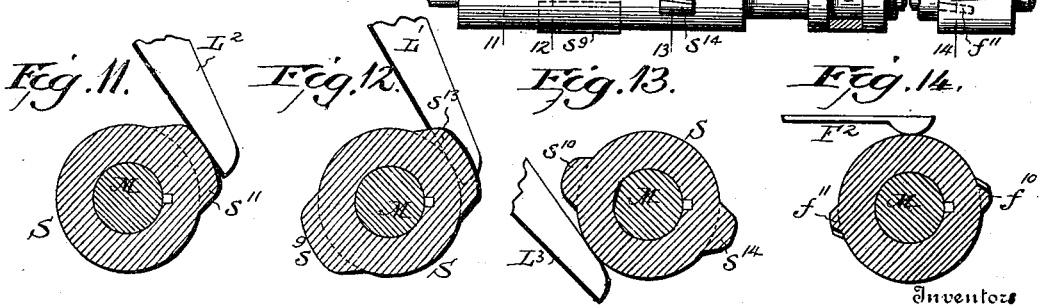
Witnesses
Inventors
Thomas L. Sturtevant,
Thomas J. Sturtevant,
By their Attorneys
Baldwin Davidson & Wight

UNITED STATES PATENT OFFICE.

THOMAS LEGGETT STURTEVANT, OF QUINCY, AND THOMAS JOSEPH STURTEVANT, OF NEWTON, MASSACHUSETTS.

EXPLOSION-ENGINE.

SPECIFICATION forming part of Letters Patent No. 662,040, dated November 20, 1900.

Application filed February 6, 1900. Serial No. 4,206. (No model.)

*To all whom it may concern:*

Be it known that we, THOMAS LEGGETT STURTEVANT, residing at Quincy, in the county of Norfolk, and THOMAS JOSEPH STURTEVANT, residing at Newton, in the county of Middlesex, State of Massachusetts, citizens of the United States, have invented certain new and useful Improvements in Explosion-Engines, of which the following is a specification.

Our invention particularly relates to that class of explosion-engines in which a suitable fuel, such as hydrocarbon vapors mixed with air in explosive proportions, is employed, the explosive mixture being first compressed and then ignited to cause an explosion which supplies the power to drive the engine. Engines of this type are very commonly used and are usually of two classes—namely, four-cycle motors and two-cycle motors. Our invention is applicable to both of these classes of engines. Engines of this type as heretofore constructed are not adapted to operate efficiently under a varying load, and our object mainly is to adapt these engines to work of an irregular nature where the load varies from time to time and where consequently greater driving power is required sometimes than at other times. This is conspicuously apparent in the case of motor-vehicles, where, as is obvious, the load is greater when the vehicle is ascending a hill than when running on a level, and as the vehicle is subject to constant stopping and starting the load is thereby constantly being varied.

We effect the objects of our invention by providing a receiver or storage-chamber containing a gas or other fluid under pressure which when the power required of the motor exceeds the normal is supplied to the engine, the supply in the receiver or storage-chamber being maintained by the engine itself, which when the power required is below normal compresses the fluid into the receiver. The best results are attained where the receiver is charged with an explosive mixture of hydrocarbon vapors and air, which supply is maintained by the engine, which forces the surplus mixture into the receiver when the power required of the engine is below normal and which receives back from the receiver a portion of the compressed mixture whenever the supply to the engine from the usual source is insufficient or when the power required of the engine is above normal.

Instead of supplying the receiver with an explosive mixture it may be supplied with air, in which case the air after leaving the receiver and before entering the engine should pass through a carbureter or be otherwise mixed with a suitable fuel. Suitable valves and suitable means for operating them are provided, and they are so arranged that the engine will operate under normal conditions without diminishing the supply in the receiver or the compression therein and without storing more fluid therein, but will when the power required of the engine is below normal permit the surplus fluid to pass to and be compressed into the receiver and when the power required is above normal can be operated to allow the compressed fluid from the receiver to enter the engine and supply the deficiency. By using a governor the operation may be made automatic. We thus provide an explosive-engine that operates uniformly under varying conditions, and the arrangement of the mechanism which we employ is also such that the engine may be conveniently started by means of the compressed fluid drawn from the receiver.

Our improved apparatus, as above described, it will be observed, combines with an explosion-engine a storage-receiver so constructed and arranged that the engine may be run temporarily by the power of the gases or fluid stored in the receiver by the previous surplus power of the engine. In one form of our apparatus an air-pump is also combined therewith in such manner as to store all the surplus power of the engine, and we sometimes render the air-pump inoperative, and thereby increase temporarily the power of the engine by relieving it of the work of compression. The valve mechanism which we employ, in addition to the functions above mentioned, has the capacity of regulating the power of the engine. The mechanism for operating the valves may be shifted so as to cause the motor to operate either on a two-cycle or four-cycle system; also, so that the cut-off may be varied.

The features of our improved apparatus which we have above mentioned, together with other important features and details of construction, will be hereinafter more fully set forth.

The subject-matter deemed novel will be distinctly claimed.

Our invention may be carried out in various ways, but the best ways now known to us are illustrated in the accompanying drawings, in which—

Figure 1 shows a plan view of so much of our improved apparatus as is necessary to understand our invention, so far as it can be illustrated by a plan view; Figs. 1$^a$ and 1$^b$ are detail views of valves which we employ. Fig. 2 shows a longitudinal section of the apparatus on the line 2 2 of Fig. 1. Fig. 3 shows an end elevation of the apparatus. The apparatus shown in Figs. 1, 2, and 3 show our improvements applied to a four-cycle motor (but which may at times be run as a two-cycle motor.) The apparatus shown in Figs. 4, 5, and 6 show our improvements applied to a two-cycle motor or one in which a separate compression-pump is used. Fig. 4 shows a vertical central section of the motor, the receiver and carbureter being shown in elevation and partly broken away. Fig. 5 shows a plan view of this apparatus and illustrates more clearly the pipe connections. Fig. 6 shows an end elevation of the apparatus and indicates more clearly the valve-operating mechanism and the passages leading to and from the motor. Fig. 7 is a detail plan view showing how a governor may be applied to the cam-shaft to vary the cut-off. Fig. 8 is a detail view, partly in section and partly in elevation, showing the manner in which the governor may be applied to the engine shown in Figs. 4, 5, and 6. Fig. 9 is a detail view, partly in perspective and partly in section, showing on an enlarged scale the construction and operation of the cams. Fig. 10 is a detail view in plan and partly in section showing the relative arrangement of the cams. Fig. 11 shows a cross-section on the line 11 11 of Fig. 9. Fig. 12 shows a cross-section on the line 12 12 of Fig. 9. Fig. 13 shows a cross-section on the line 13 13 of Fig. 9, and Fig. 14 shows a cross-section on the line 14 14 of Fig. 9.

Referring first to Figs. 1, 2, and 3, which, as before stated, indicate our improvements applied to a four-cycle motor, it will be observed that the cylinder-piston, crank-shaft, &c., are of usual construction, and it may here be stated that our improvements are applicable to various types of motors, the improved construction of mechanism which we employ in carrying out our invention being confined for the most part to the valve mechanisms and to the connections between the engine, the receiver, and the carbureter.

The four valves which we employ in the engine itself are all located, preferably, as shown, in a valve-casing X at the rear end of the cylinder. The exhaust-valve A opens inwardly. Its stem is provided with a collar $a$, beneath which is a spring $a'$, that normally holds the valve against its seat. One end of a bell-crank lever L' bears upon the upper end of the valve-stem, its central portion being pivoted to a standard $l$ and its opposite end being arranged in the path of a cam or cams on the tubular cam-shaft L, the arrangement being such that the exhaust-valve is opened positively at proper times by the lever L' and is closed by the spring $a'$. The main admission-valve B is an automatic valve, being preferably arranged just beneath the exhaust-valve and pressed to its seat by a spring $b$, the explosive mixture lifting the valve when entering the cylinder.

The valve C is interposed between the cylinder and the port $d^5$. The stem of this valve is tubular, and it is provided on its upper end with a collar $c$, beneath which extend the arms of a bell-crank lever L$^3$, pivoted to a standard $l^2$ and having an arm extending into the path of cams on the cam-shaft L. The valve D is provided with a stem which extends through the tubular valve-stem $c'$, and at its upper end it is provided with a collar $c^2$, between which and the collar $c$ is interposed a spring $c^3$. This spring tends to move the valves C and D in opposite directions, and thereby draw them against their seats, which are arranged on opposite sides of an annular flange $x$, arranged between the cylinder and the port $d^5$. One end of a bell-crank lever L$^2$ bears on the upper end of the valve-stem $d$, this lever being pivoted to the standard $l^2$ and having an arm arranged in the path of cams on the cam-shaft L.

The ignition devices E are preferably arranged immediately below the valves C and D. The tubular cam-shaft L is arranged to revolve with, but slide on, a valve-operating shaft M, which is actuated by suitable gearing $m$, connecting it with the crank-shaft of the engine. The sleeve may be adjusted longitudinally on the shaft M by means of an operating-lever G, which may be shifted in either direction and set to hold the sleeve in its adjusted position. The sleeve is provided with devices $f$ for actuating the contact devices F of the ignition apparatus, and it is provided with a hub S, carrying a number of cams so constructed and arranged as to properly operate the levers L' L$^2$ L$^3$ to actuate the valves A, C, and D. By providing such means for shifting the cams the motor may be operated as either a four-cycle or a two-cycle motor, and the cut-off may be varied, and the time of operating the ignition devices may also be correspondingly changed.

In Fig. 7 we have shown how a governor of ordinary form may be applied to the cam-shaft. The centrifugal devices M' are applied to a prolongation of the engine-shaft, and these centrifugal devices are provided with a hub $m^2$, connecting with one end of a bell-crank lever $m^3$, connected by means of a link $m^4$ with the lever G, which is in turn connected with the sleeve S, carrying the cams. By this means the sleeve may be shifted in such manner as to vary the position of the cam $s^{10}$ with reference to the lever $L^3$, which controls the operation of the valve C. Thus the valve C is regulated in its operation by the speed of the engine. The cam $s^{10}$, it will be observed, has an inclined or diagonally-arranged edge, and the time when it operates will depend on the position of this cam relatively to the end of the lever $L^3$, which it operates. The shifting of the sleeve by the governor also varies the time of ignition, the ribs or cams $f^{10}$ and $f^{11}$ being inclined, as shown in Figs. 9 and 10.

It will be further observed by reference to Figs. 9 to 14, inclusive, that the sleeve S is provided with a number of cams on opposite sides, the construction being such that the engine may be made to operate either as a four-cycle or a two-cycle engine. The lever $L^2$, which operates the valve D, is operated by a cam $s^{11}$ when the engine is working on the four-cycle principle, and when working on the four-cycle principle the lever $L'$ is operated by the cam $s^9$. The lever $L^3$, which operates the valve C, is operated when working as a four-cycle engine by the cam $s^{10}$, the lever of the ignition devices being operated by the rib or cam $f^{10}$. When, however, it is desired to work the engine as a two-cycle engine, the sleeve S is moved to the right. This will throw the lever $L^2$ and the valve D out of action; but it will throw the cams $s^{13}$ and $s^{14}$ and the rib $f^{11}$ into action, so that during each revolution of the sleeve S two cams will operate on the levers $L'$ $L^3$ and the lever $F^2$ of the ignition device. It will thus be readily understood how the engine may be made to operate either as a four-cycle or a two-cycle engine.

The exhaust-outlet communicates with the open air. The main admission-port is connected by means of a pipe $B'$ with a carbureter or mixing-chamber H, to which fuel is supplied through a pipe $h$ and which receives air through a valve $h'$. The port $d^5$, which communicates with the chamber Y, above the seats of the valves C and D, is connected by means of a pipe $d^6$ with a receiver or storage-chamber I. This pipe is provided with a safety-valve J and with a combined stop-and-check valve K, that is also a throttling-valve. A branch pipe $d^7$ leads from the valve J to the pipe $B'$.

The safety-valve J prevents the pressure in the receiver from exceeding a given amount. When the pressure in the receiver is excessive, fluid from the receiver passes through this valve to the carbureter, but is prevented from escaping through the air-entrance of the carbureter by the valve $h'$, which is a check-valve. Thus any fluid which escapes from the receiver during the normal working of the engine is not lost, but passes to the engine and is either utilized therein or is returned back to the receiver. At such times, owing to the increased pressure in the carbureter, the check-valve $h'$ closes, stopping the admission of air until the normal pressure is restored.

The apparatus, being thus constructed, operates as follows: In order to start the engine, we prefer to first charge the receiver with a proper fluid until it is sufficiently compressed therein. This may be done by the use of an independent pump supplied with air or other suitable fluid. We prefer, however, to charge the receiver by means of the engine. To do this, we first allow the throttle-valve K to close by raising the screw-spindle, the valve being then closed by its spring. At this time fluid may be pumped past the valve from the engine to the receiver, but the fluid cannot pass back from the receiver to the engine. As soon as the desired pressure is obtained the fly-wheel of the engine is turned to such an extent as to cause the piston to just pass the commencement of a power-stroke. Then the throttle-valve K is opened by depressing the screw-spindle, and the valve thereafter remains open during the subsequent operation of the engine, permitting fluid to pass freely from the engine to the receiver or from the receiver to the engine. The amount of fluid passing in either direction may be regulated by a proper adjustment of the screw-spindle. When the valve K is opened, as above described, and the valve C has been opened in the meantime by its operating mechanism and the piston has just passed the commencement of a power-stroke, as above explained, the fluid passes into the chamber Y and the valve D opens automatically, admitting the fluid to the chamber behind the piston. The pressure of the fluid acting on the piston starts the engine on its forward stroke, and at a predetermined time the valve C is allowed to close and then the explosion occurs. The pressure generated by the explosion gives the piston a powerful impulse, which is its power-stroke. On the return stroke of the piston the products of combustion pass out through the exhaust, the valve A being opened at the proper time to permit the exhaust. On the next outward stroke the automatic main admission-valve B opens and the fluid is drawn through the pipe $B'$ to supply the next charge. As shown in the drawings, the supply through the pipe $B'$ comes from the carbureter H. During this period the valves C and D remain closed. On the commencement of the next return stroke the valve D is opened by its operating mechanism and remains open during the entire stroke, and when the pressure in the cylinder exceeds that of the receiver the valve C will automatically open, permitting the surplus of the mixture to pass to and be stored in the receiver. The next forward stroke of the piston is a working or power stroke, the fluid being exploded at the proper time. During this stroke the valve C is opened and remains open during a short period at the commencement of the stroke. The mixture flowing from the receiver to the cylinder opens the valve D automatically. On the closure of the valve C the valve D closes automatically and the mixture is fired, giving a power impulse to the engine. On the return stroke of the piston the exhaust-valve opens and remains open during the entire return stroke, and thereafter the engine operates in the usual manner, the admission being always through the valve B when the engine is operating normally, but an additional supply of the fluid being drawn past the valves C and D and used whenever the power required of the engine is above normal or when the supply is insufficient. In like manner the exhaust is always past the valve A, and fluid is forced from the cylinder by way of the valves C and D, to be stored only when the power required of the engine is below normal or when the supply exceeds the demand. It is true that under normal conditions the engine draws from the receiver; but it always returns an equal amount thereto. It receives and uses fluid from the receiver only when the power required of the engine is excessive or when starting.

It is evident that when less of the fluid is readmitted to the cylinder than was taken from it and charged in the receiver, either by the partial closure of the throttle-valve K or by changing the cut-off by the lateral shifting of the cam-shaft, then the pressure in the receiver will increase and power will be stored. On the other hand, it is evident that more fluid can be drawn from the receiver than is compressed into it by a single stroke, and thus the engine will develop much above its normal power for a period depending on the pressure and capacity of the receiver. To still further increase the power of the engine, the cam-shaft may be shifted laterally far enough to bring a different set of cams into position to operate the supplemental admission-valve C and exhaust-valve A, it being remembered under these conditions that the valve D is not operated from the cam-shaft, but is operated automatically when the valve C is lifted during the flow of the fluid from the receiver to the engine. Under these conditions admission of the charge, the cut-off, and ignition, followed and accompanied by a power stroke, take place during each forward stroke of the engine, while each return stroke is an exhaust stroke. This cycle is continued as long as the receiver contains the fluid at a pressure sufficient for the working of the motor. No work is done in this cycle in compressing the fluid into the receiver, the motor drawing entirely on its stored power. Under these conditions the engine will develop for a short period a power more than twice its normal power.

An engine organized in the manner above specified develops considerable power even at slight rotative speed, and its power can be varied within wide limits, being analogous to a steam-engine in this respect.

When the engine is used where the power required is invariable, the receiver may, if desired, be entirely shut off, as the receiver is not necessarily used in the operation of the engine, but is used where the power required of the engine varies.

It will be observed that the valves C and D are placed close together, there being but a very small space between them, and thus there is no liability of much waste, which might be caused if the fluid should accumulate in a chamber or long passage between the valves. Furthermore, the arrangement is such that if any of the fluid under pressure does accumulate between the two valves the valve D will open automatically to permit it to pass to the cylinder, and this may pass from the cylinder through the exhaust during the exhaust-stroke. A further feature incident to the apparatus described is that after the air has been mixed with fuel to form an explosive mixture it is not allowed, except in the case just stated, to escape unused from the apparatus, but is charged into the receiver. Any mixture escaping from the receiver by way of the safety-valve J is returned to the cylinder of the motor or to the receiver, the closing of the check-valve $h'$ at the air-inlet of the carbureter preventing any outside air entering until the mixture discharged by the safety-valve is used.

We of course adopt means, such as wire-netting placed in the pipes or ports, to prevent accidental explosion, and the valves are so arranged as to close automatically in case of premature explosion of the charge. It should also be observed that the organization is such that the power of the engine may be varied by changing the amount but not the pressure of the charge before ignition, or, in other words, changing the cut-off and the high rate of expansion, especially when the engine is running much below its normal power, obviates much of the sharp and disagreeable noise of the exhaust.

When simplicity is of much more importance than economy, the power may be regulated by the throttle-valve, which varies the amount of explosive mixture used by altering its pressure before ignition, the cut-off in such case not being changed.

Referring now to Figs. 4, 5, and 6, which show the two-cycle motor, the receiver and carbureter are indicated, respectively, by the letters I and H. The valve mechanism and the pipe connections are quite similar in principle to those before described; but as they vary in detail different letters will be employed. The power-cylinder P and the air-pump Q are of usual construction. They are connected in the usual way to a crank-shaft R, provided with a fly-wheel R'. In this instance the admission, exhaust, and exit valves are located at the sides of the cylinders. The exhaust-valve T is located in a valve-chamber communicating with the rear end of the power-cylinder, and two admission-valves U U' are located by the side of the exhaust-valve. The exhaust-valve is operated by a cam r on the crank-shaft, and this shaft is also provided with devices for operating the electric contact devices R². The valves U and U' are arranged on opposite sides of a flange u, which is provided with seats for the valves. The valve U is located below the flange, while the valve U' is located above it. The valve U' is an automatic valve, being pressed to its seat by a spring u', and this valve opens automatically by the pressure of the gas or gases employed when passing to the cylinder. The valve U is operated by a cam r' on the crank-shaft. The pump Q is provided with two valves V and V'. The valve V' is an automatic valve pressed to its seat by a spring v. The valve V is also an automatic valve pressed to its seat by a spring v'. The carbureter H is provided with a pipe h, supplying it with fuel, and with an inlet having a valve h' for supplying it with air. A pipe H² leads from the carbureter and joins a pipe W, which passes from the receiver I to the valve-chamber just below the valve U. A branch pipe H³ connects the pipe H² with the chamber just below the valve V, while a branch H⁴ connects the pipe W with the chamber just above the valve V'. The pipe W is provided with a combined check and stop valve W', similar to the valve K, and with a safety-valve J. The pipe is also provided with a throttle-valve W². If desired, an automatic governor, such as shown in Fig. 8, may be applied to the throttle-valve. We have shown an ordinary form of governor for this purpose. The valve mechanism W² corresponds to the corresponding valve mechanism shown in Figs. 4, 5, and 6, except that the valve-stem is connected with the centrifugal balls W⁵, which are geared with a shaft w⁵, carrying a pulley w⁶, which may be belted in any usual way to the crank-shaft on the engine. By the use of such mechanism the supply of fuel or explosive mixture to the engine may be automatically regulated. In the operation of this apparatus the admission, cut-off, and ignition occur on each downstroke, while the return stroke exhausts the products of combustion from the cylinder. The compression of the charge occurs in the pump-cylinder, the downstroke drawing air through the carbureter into the cylinder, while the return stroke compresses the mixture into the receiver. The power developed can be governed by altering the cut-off or by means of the throttle-valve W², which acts to vary the pressure of the mixture in the cylinder before ignition independently of the pressure in the receiver. This form of engine may be started and operated in a similar way to that shown in Figs. 1, 2, and 3, with the exceptions above mentioned. More in detail the operation is as follows: In starting, the valve W² being closed, the fly-wheel is given a few turns by hand until a sufficient amount of explosive mixture is forced into the receiver. Then the fly-wheel is turned by hand until the power-piston P is started on its downstroke. Then the valve W² is opened, the valve U having been in the meantime opened by its cam r'. The explosive mixture then rushes past the valve U and lifts the valve U'. The power-piston then continues on its downstroke, and after it has moved downward a short distance the valve U closes. Then the mixture is fired and the pressure generated by explosion gives the piston a power-stroke and at the same time the valve U' is closed. The momentum of the moving parts carries the piston upward on its exhaust-stroke, the valve T being opened and held open during the exhaust. The valve T, however, of course closes before the admission-valve U is again opened. When the power-piston starts on its first downstroke, the pump-piston Q moves upward on its compression-stroke, and when the compressed fluids attain a pressure slightly greater than that in the receiver and the passages leading thereto the valve V' opens and the compressed fluid passes into the receiver and the passages leading thereto. As soon as the air-pump piston starts on its downstroke the valve V' is closed by the receiver-pressure, &c. The downward movement of the piston Q causes a slight vacuum, which in turn causes the valve V to lift, and air after passing through the carbureter, mixer, or vaporizer enters the pump-cylinder. These cycles are repeated indefinitely. It is clear that in the operation of this type of engine if less of the explosive mixture is used than is pumped into the receiver power is stored in the receiver. If, however, more fluid is used in the motor-cylinder than is pumped simultaneously by the pump, a power greater than normal will be developed, because the stored power is drawn on. We may also employ an additional check-valve Z, placed in the pipe W, the automatic action of which serves to prevent any possible explosion in the pipes or passages from entering the receiver.

We may render the air-pump inoperative for charging the receiver or for compression, and may thus increase temporarily the power of the engine by relieving it of the work of compression. This may be effected by simply using a stop-cock Z', placed in the end of the air-pump cylinder. By opening the cock air may be let in and out from the pump-cylinder freely, and thus no compression will take place and fluid will not be drawn past the valves V V'.

It will be observed that at times fluid is drawn from a main source of supply and at times from a receiver. The fluid from the main source usually passes through a mixer, carbureter, or vaporizer. Where in the claims we use the term "mixer" we intend to include either what is known in the art as a "mixer" or a "carbureter" or a "vaporizer."

We claim as our invention—

1. The combination with an explosion-engine, of a source of fuel for normal running, a valved connection between said source of fuel and the engine, constructed and operated to admit all the fuel for normal running, a receiver for fluid under pressure, and a valved connection between the receiver and the engine, constructed and operated to admit fluid from the receiver to augment the charge in the engine each time that the charge admitted from the main source is insufficient.

2. The combination with an explosion-engine, of a source of fuel for normal running, a valved connection between said source of fuel and the engine, constructed and operated to admit all the fuel for normal running, a receiver for fluid under pressure, and a valved connection between the receiver and the engine, constructed and operated automatically to admit fluid from the receiver to augment the charge received from the main supply at each operation of the engine only when the power required of the engine is above normal.

3. The combination with an explosion-engine, of a source of fuel for normal running, a valved connection between said source of fuel and the engine, constructed and operated to admit the fuel for normal running, a receiver for fluid under pressure, and a valved connection between the receiver and the engine, constructed and operated to allow unburned fuel to pass from the power-cylinder of the engine to the receiver whenever the power required of the engine during its operation is below normal.

4. The combination with an explosion-engine, of a source of fuel for normal running, a valved connection between said source of fuel and the engine, constructed and operated to admit all the fuel for normal running, a receiver for fluid under pressure, and a valved connection between the receiver and the engine, constructed and operated to allow unburned fuel to pass from the engine to the receiver whenever the power required of the engine during its usual operation is below normal, and also to admit fluid from the receiver to augment the charge in the engine whenever the power required of the engine is above normal.

5. The combination with an explosion-engine, of a source of fuel at low pressure for normal running, a valved connection between said source of fuel and the engine, constructed and operated to admit all the fuel for normal running, a receiver for fluid under pressure, and a valved connection between the receiver and the engine constructed and operated to admit fluid from the receiver at high pressure to augment the charge admitted from the main source of supply at each operation of the engine while the power required of the engine is above normal.

6. The combination with an explosion-engine, of a source of fuel for normal running, a valved connection between said source of fuel and the engine, constructed and operated uniformly during the operation of the engine, a valved exhaust-passage also constructed and operated uniformly during the operation of the engine, a receiver for fluid under pressure and two valves facing each other and seating themselves in opposite directions in the same valve-chamber interposed between the receiver and the engine, and constructed and operated to admit fluid from the receiver to augment the charge in the engine whenever the power required of the engine is above normal.

7. The combination with an explosion-engine, of a source of fuel for normal running, a valved connection between said source of fuel and the engine, constructed and operated to admit fuel uniformly during the operation of the engine, a valved exhaust-passage also constructed and operated uniformly during the operation of the engine, a receiver for fluid under pressure, and two valves facing each other and seating themselves in opposite directions in the same valve-chamber, constructed and operated to allow unburned fuel to pass from the engine to the receiver whenever the power required of the engine is below normal.

8. The combination with an explosion-engine, of a source of fuel for normal running, a valved connection between said source of fuel and the engine, constructed and operated to admit the fuel for normal running, main admission and exhaust valves constructed and operated to admit and exhaust on a four-cycle system, a receiver for fluid under pressure, and a valved connection between the receiver and the engine constructed and operated automatically during the compression-stroke of the engine to allow surplus fluid to pass to the receiver whenever the power required of the engine is below normal.

9. The combination with an explosion-engine, of a source of fuel for normal running, a valved connection between said source of fuel and the engine, constructed and operated to admit the fuel for normal running on a four-cycle system, a receiver for fluid under pressure, and a valved connection between the receiver and the engine constructed and automatically operated after the compression-stroke to admit fluid from the receiver to the engine whenever the power required of the engine is above normal.

10. The combination with an explosion-engine, of a source of fuel for normal running, a valved connection between said source of fuel and the engine, constructed and operated to admit the fuel for normal running, a receiver for fluid under pressure, a connection between the receiver and the engine, two valves interposed in said connection controlling the passage between the receiver and the engine, devices for positively opening said valves at times, and devices permitting said valves at times to open automatically.

11. The combination with an explosion-engine, of a source of fuel for normal running, a valved connection between said source of fuel and the engine, constructed and operated to admit the fuel for normal running, a receiver for fluid under pressure, a valved connection between the receiver and the engine, constructed and operated to admit fluid from the receiver to augment the charge in the engine whenever the power required of the engine is above normal, and a throttle-valve interposed in said connection between the receiver and the engine for regulating the power of the engine.

12. The combination with an explosion-engine, of a source of fuel for normal running, a valved connection between said source of fuel and the engine, constructed and operated to admit fuel for normal running, a receiver for fluid under pressure, and a valved connection between the receiver and the engine, constructed and operated to admit fluid from the receiver to augment the charge in the engine whenever the power required of the engine is above normal, and valves interposed between the engine and the receiver and the engine and the main source of supply, constructed and operated to allow unused gases to be pumped around in circuit until used when the charge in the receiver is at abnormally high pressure.

13. The combination with an explosion-engine, of a source of fuel for normal running, a valved connection between said source of fuel and the engine, constructed and operated to admit fuel for normal running, a receiver for fluid under pressure, a mixer having a port for the admission of fuel, and a valved port for the admission of air, a valved connection between the receiver and the mixer, and valved connections between the receiver and the engine, said valved connections between the receiver and the mixer and the receiver and the engine, being constructed and operated to admit fluid from the receiver to augment the charge in the engine whenever the power required of the engine is above normal and to allow unused gases to be pumped around in a circuit until used, before any fresh air is taken into the mixer.

14. The combination with an explosion-engine, of a source of fuel for normal running, a valved connection between said source of fuel and the engine, a receiver for fluid under pressure, a valved connection between the receiver and the engine, constructed and operated to admit fluid from the receiver to augment the charge in the engine, a mixer having a passage for the entrance of fuel and a valved passage for the entrance of air, and a valved connection between the receiver and the mixer for permitting fluid to pass from the receiver to the mixer when the pressure in the receiver is excessive.

15. The combination with an explosion-engine, of a source of fuel for normal running, a valved connection between said source of fuel and the engine, a receiver for fluid under pressure, a valved connection between the receiver and the engine, a mixer, a passage through which fuel is admitted to the mixer, a pipe having a check-valve through which air is admitted to the mixer, a connection between the mixer and the receiver, and a safety-valve interposed in said connection to allow the fluid to pass from the receiver to the mixer whenever the pressure in the receiver is excessive.

16. The combination with an explosion-engine, of a source of fuel for normal running, a valved connection between said source of fuel and the engine, a receiver for fluid under pressure, a valved connection between the receiver and the engine, a mixer, supply-passages through which fuel and air are admitted to the mixer, a check-valve in the air-supply passage, a connection between the mixer and the receiver, a safety-valve in said passage, and a combined stop and check valve in the connection between the receiver and the engine.

17. The combination with an explosion-engine, of a source of fuel for normal running, a valved connection between said source of fuel and the engine, a receiver for fluid under pressure, the combined admission and discharge valves, C and D, arranged close to each other in the connection between the receiver and the engine, with a minimum intervening space for the accumulation of compressed gases.

18. The combination with an explosion-engine, of a source of fuel for normal running, a valved connection between said source of fuel and the engine, a receiver for fluid under pressure, an air-supply, a valved connection between the receiver and the engine, constructed and operated to admit fluid from the receiver to augment the charge in the engine whenever the power required of the engine is above normal, and valve mechanism constructed and operated to prevent the admission of air after a predetermined maximum pressure is obtained in the receiver and until a safe maximum pressure is obtained.

19. The combination with an explosion-engine, of a source of fuel for normal running, a valved connection between said source of fuel and the engine, means for operating the engine to develop a pressure in the charge greater than the charge before ignition, a variable cut-off, a receiver for fluid under pressure, and a valved connection between the receiver and the engine, constructed and operated to admit fluid from the receiver to the engine to increase the normal power thereof.

20. The combination with an explosion-engine, of a source of fuel for normal running, a connection between said source of fuel and the engine, an automatic valve interposed in said connection between the source of fuel and the engine, a receiver for fluid under pressure, a valve interposed in the connection between the receiver and the engine, opening automatically toward the engine, another valve in said connection between the receiver and the engine, opening automatically toward the receiver, means for opening the exhaust-valve after each explosion, and devices for operating the valves in the connection between the receiver and the engine to hold both of said valves closed during the exhaust, to hold one of the valves open during compression, and to hold both of said valves open for a time during the working or power stroke of the engine.

21. The combination with an explosion-engine, of a source of fuel for normal running, on a four-cycle system, a valved connection between said source of fuel and the engine, constructed and operated to admit the fuel during each admission-stroke, a receiver for fluid under pressure, a valved connection between the receiver and the engine, an exhaust-valve, and mechanism for operating said valves to permit fluid to pass from the receiver to the engine during each forward stroke of the piston, while the power required of the engine is above normal.

22. The combination with an explosion-engine, of a source of fuel for normal running, a valved connection between said source of fuel and the engine, an exhaust-valve, a receiver for fluid under pressure, a valved connection between the receiver and the engine, mechanism for operating said valves between the receiver and the engine, to prevent the passage of fluid from the receiver to the engine when the latter is running on a four-cycle system, and devices for changing the valve-operating mechanism to operate the exhaust-valve and the valves between the receiver and the engine, to permit an exhaust during each inward stroke of the piston, and an admission from the receiver after each inward stroke of the piston, so that the engine then operates on a two-cycle system.

23. The combination of an explosion-motor or internal-combustion engine, compressing its gases in the power-cylinder and on the power side of the piston, a receiver for compressed gases, a source of fuel for normal running, a valved connection between said source of fuel and the engine, an exhaust-valve, means for operating it to cause the engine to operate on a four-cycle system, and a valved connection between the engine and the receiver, constructed and operated to allow fluid to pass from the receiver to the combustion-chamber of the engine after each inward stroke of the piston, thereby causing the engine to operate on a two-cycle system when the power required of the engine is above normal.

24. The combination with an explosion-engine, of a source of fuel for normal running, a valved connection between said source of fuel and the engine, an exhaust-valve operated to cause the engine to run on a four-cycle system when the power required of the engine is normal, a receiver for fluid under pressure, a valved connection between the receiver and the engine, and valve-operating mechanism acting upon the exhaust-valve and the valves between the receiver and the engine to cause the valves between the receiver and the engine to prevent the admission of fluid to augment the charge in the engine when the engine is running normally, and also to act upon the exhaust-valve and said valves between the engine and the receiver, to cause the exhaust-valve to be opened at each inward stroke of the piston, and the valves between the receiver and the engine to be opened to admit a charge from the receiver after each inward stroke of the piston, the organization being such that when the power required of the engine is normal the engine may be run economically on a four-cycle system, but when greater power is required the engine may be run with increased power on a two-cycle system.

25. The combination with an explosion-engine, of a source of fuel for normal running, a valved connection between said source of fuel and the engine, a receiver for fluid under pressure, a valved connection between the receiver and the engine, an exhaust-valve, and means for operating the exhaust-valve and the valves between the engine and the receiver to cause the engine to run on a four-cycle system when the power required of the engine is normal, to cause the valves between the receiver and the engine to permit the passage of fluid from the receiver to the engine when the power required of the engine is above normal, but to prevent the passage of fluid from the receiver to the engine when the power required of the engine is normal or below normal, and also to permit the passage of fluid from the engine to the receiver when the power required of the engine is below normal.

26. The combination with an explosion-engine, of a source of fuel for normal running, a valved connection between said source of fuel and the engine, a receiver for fluid under pressure, a mixer, a connection between the receiver and the mixer, a valve controlling the connection between the receiver and the mixer, another valve controlling the connection between the receiver and the engine, and valve mechanism constructed and operated to admit fluid to the engine from the receiver.

27. The combination with an explosion-engine, of a source of fuel for normal running, a valved connection between said source of fuel and the engine, a receiver for fluid under pressure, a valved connection between the receiver and the engine, constructed and operated to admit fluid from the receiver to augment the charge in the engine whenever the power required of the engine is above normal, and devices for varying the cut-off of fluid admitted from the receiver to the engine.

28. The combination with an explosion-engine, of a source of fuel for normal running, a valved connection between said source of fuel and the engine, a receiver for fluid under pressure, a connection between the receiver and the engine, a valve interposed in said connection between the receiver and the engine, constructed and operated to at times permit the passage of fluid from the engine to the receiver and prevent the passage of fluid from the receiver to the engine, devices for setting this valve, to permit free communication between the engine and the receiver in both directions, and valve mechanism in said connection between the receiver and the engine, constructed and operated to admit fluid from the receiver to the engine when the power required of the engine is above normal.

29. The combination with the combustion-chamber of an engine, of a receiver, a valved connection between the combustion-chamber of the engine and the receiver, a pump having valved connections between the receiver and the combustion-chamber of the engine, an admission-valve for the pump, and devices for at times rendering the pump inoperative for compression, said valve mechanism between the receiver and the combustion-chamber of the engine being constructed and operated to admit fluid from the receiver to the combustion-chamber of the engine when the compressing-pump is rendered inoperative.

30. The combination with an explosion-engine, of a compressing-pump, a source of fuel therefor, a valved connection between the pump and said source of fuel, a receiver for compressed fluid, a valved connection between the receiver and the combustion-chamber of the engine, and between the combustion-chamber of the engine and the pump, and devices for operating said valves to cause the pump to supply fluid to the combustion-chamber of the engine when the power required of the engine is normal, and for operating said valves to cause fluid from the receiver to pass to the combustion-chamber of the engine when the power required of the engine is above normal.

31. The combination with an explosion-engine, of a mixer, a valved connection between the mixer and the engine, a receiver for fluid under pressure, a valved connection between the engine and the receiver, and a valved by-pass between the connections of the receiver with the mixer and the receiver with the engine.

32. The combination with an explosion-engine, of a source of fuel for normal running, a valved connection between said source of fuel and the engine, a receiver for fluid under pressure, a valved connection between the receiver and the engine, constructed and operated to admit fluid from the receiver to the engine, and to permit the receiver to be charged from the engine, and valve-operating mechanism provided with devices for varying the cut-off.

33. The combination with an explosion-engine, of a pump, a source of fluid for the pump, a valved connection between the pump and the engine, a receiver for fluid under pressure, a valved connection between the receiver and the engine, means for operating the valves to cause the engine to be supplied with fluid directly from the pump alone, or with fluid taken from both the receiver and the pump, and devices for rendering the pump inoperative, to cause the engine to receive fluid from the receiver alone.

34. The combination with an explosion-engine, of a pump, a source of fluid therefor, a valved connection between the pump and said source of fluid, a valved connection between the pump and the engine, a receiver for compressed fluid, a valved connection between the receiver and the engine, constructed and operated to admit fluid from the receiver to the engine when the pump is not compressing, and devices for rendering the pump inoperative for compressing the fluid admitted to it.

35. The combination with an explosion-engine, of a source of fuel for normal running, a connection between the engine and said source of fuel, a receiver for compressed gases, an automatic valve opening inward toward the combustion-chamber of the engine, a positively-operated valve placed close to said first-mentioned valve, and governing the same port, and other valves controlling the admission of fluid from the source of supply to the engine.

In testimony whereof we have hereunto subscribed our names.

THOMAS LEGGETT STURTEVANT.
THOMAS JOSEPH STURTEVANT.

Witnesses:
LLOYD MAKEPEACE,
O. B. MONEY.